United States Patent [19]
Minshall et al.

[11] Patent Number: 5,323,758
[45] Date of Patent: Jun. 28, 1994

[54] BARBECUE GRILL

[75] Inventors: Shawn Minshall, Mississauga; Stuart McKenzie, Wyevale, both of Canada

[73] Assignee: Fiesta Barbeques Ltd., Mississauga, Canada

[21] Appl. No.: 929,811

[22] Filed: Aug. 14, 1992

[51] Int. Cl.5 .................................................. F24B 3/00
[52] U.S. Cl. .................................. 126/25 R; 126/9 R; 126/41 R
[58] Field of Search .................... 126/41 R, 25 R, 9 R, 126/9 B

[56] References Cited

U.S. PATENT DOCUMENTS

| | | | |
|---|---|---|---|
| D. 282,619 | 2/1986 | Fitzgerald et al. | D7/332 |
| 3,386,432 | 6/1968 | Hanson | 126/41 R |
| 4,094,295 | 6/1978 | Boswell et al. | 126/25 R |
| 4,430,559 | 2/1984 | Rabay | 126/25 R |
| 4,667,652 | 5/1987 | Bunton | 126/25 |
| 4,924,846 | 5/1990 | Peacock et al. | 126/41 |
| 4,955,358 | 9/1990 | Harris et al. | 126/41 R |
| 4,979,437 | 12/1990 | Giebel et al. | 99/345 |
| 4,985,068 | 1/1990 | Hanagan et al. | 99/357 |
| 5,076,256 | 12/1991 | Raymer et al. | 126/41 |
| 5,076,257 | 12/1991 | Raymer et al. | 126/41 |
| 5,090,398 | 2/1992 | Raymer et al. | 126/41 |

FOREIGN PATENT DOCUMENTS

2046027 7/1991 Canada .

*Primary Examiner*—Carroll B. Dority
*Attorney, Agent, or Firm*—Merchant, Gould, Smith, Edell, Welter & Schmidt

[57] ABSTRACT

A barbecue grill is disclosed having a plurality of vertical leg members, a cooking vessel, a bracket for securing the vertical leg members and supporting the cooking vessel, wherein the bracket has a pair of oppositely disposed shelf attachments. Each of the shelf attachments has a pair of horizontally and vertically offset extensions with slots therein, and at least one side shelf has a pair of horizontally and vertically offset pins on opposite sides thereof adapted to slide within respective ones of the slots for selectively: 1) locking the shelf in a horizontal position; 2) pivoting the shelf downwardly from the horizontal position to a vertical position; and 3) removing the shelf from the bracket.

7 Claims, 7 Drawing Sheets

a
BARBECUE GRILL

FIELD OF THE INVENTION

This invention relates in general to barbecue grills, and more particularly to a quick assembly barbecue grill with drop-down side shelves and fewer assembly parts.

BACKGROUND OF THE INVENTION

Well known outdoor barbecue grills typically comprise a frame portion having a plurality of vertical leg members, a cooking vessel supported on the frame portion, a hinged lid, and one or more side and front shelves. It is well known to provide brackets for selective pivotal movement of the side and front shelves.

Examples of well known prior art outdoor barbecue grills are disclosed in the following U.S. Pat. Nos.: 4,895,068 (Hannigan et al); 4,667,652 (Bunton); 4,979,437 (Giebel); 4,924,846 (Peacock et al); 5,076,257 (Raemer et al); 5,076,256 (Raemer et al); 5,090,398 (Raemer et al) and U.S. Pat. No. Des. 282,619 (Fitzgerald et al).

One disadvantage of the known prior art barbecue grills is that the assembly thereof is often complicated and time consuming. For example, where the barbecue grill includes a large number of small parts such as brackets, bolts, nuts, screws, etc., the purchaser of the grill may become frustrated in assembling the unit due to misplacement or loss of many small parts, as well as instructions which are difficult to understand, and parts which are difficult to connect, etc.

SUMMARY OF THE INVENTION

According to the present invention, an outdoor barbecue grill is provided with a minimum number of parts for easy and quick assembly by the end user. According to the invention, various components of the barbecue grill serve multiple functions and require very few bolts and screws for their assembly. Furthermore, according to the present invention, many of the fasteners such as bolts and screws are replaced by drop-fit protrusions and apertures which are hidden from view when the grill is in a final assembled form.

Various aspects of the invention are defined by the claims.

BRIEF INTRODUCTION TO THE DRAWINGS

A description of the preferred embodiment is provided hereinbelow with reference to the following drawings, in which.

DETAILED DESCRIPTION OF THE PREFERRED EMBODIMENT

Figure 1:
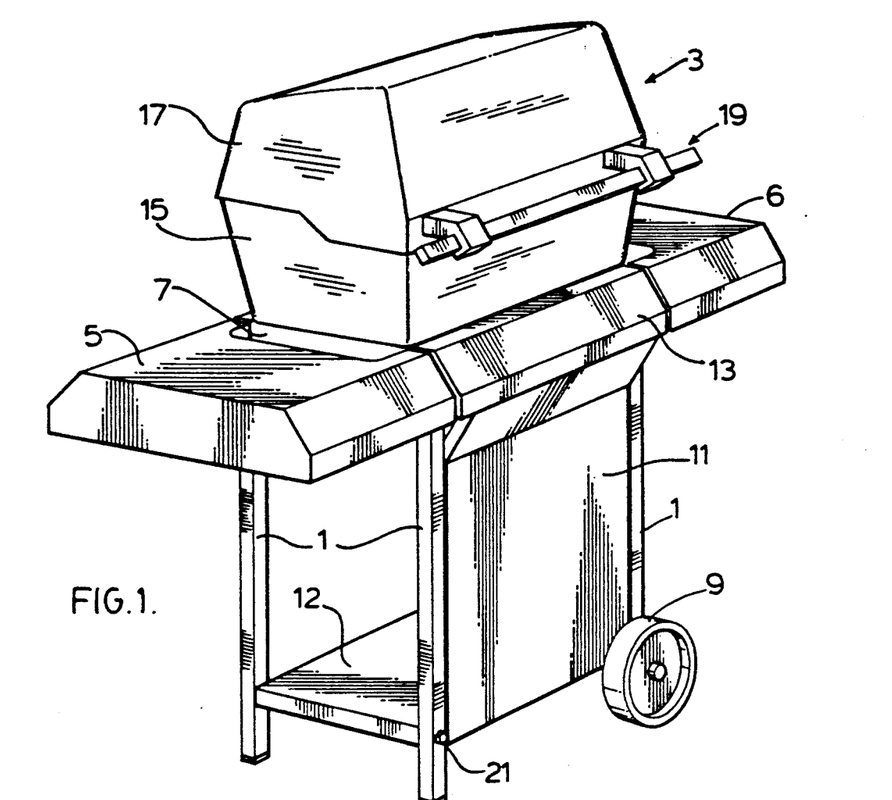
FIG. 1 is a perspective view of an outdoor barbecue grill according to the present invention.

Turning to FIG. 1, a barbecue grill according to the present invention is shown comprising a plurality of vertical leg members 1, a cooking vessel 3, side shelves 5 and 6, and side bracket 7. The barbecue grill also includes a pair of wheels such as the wheel 9, connected to the vertical leg members 1 in a well known manner.

A front panel 11 is connected to the frontmost pair of vertical leg members 1 as discussed in greater detail below with reference to FIGS. 3-5. The panel 11 may be provided with decorative graphics.

A bottom shelf 12 is connected to the four vertical leg members and provides a surface for carrying a propane tank, cooking implements, etc.

A control panel 13 is provided with a tapered front conforming to the tapered front surfaces of side shelves 5 and 6. The control panel 13 is shown without control knobs such as cooking gas valve controls, etc., for the sake of clarity.

The cooking vessel 3 is of clam shell construction comprising a lower portion 15 for housing a gas or charcoal heating source, and an upper lid 17 which is hinged to the lower portion 15 for pivotal movement in response to lifting of the lid 17 via handle 19, discussed in greater detail below with reference to FIGS. 13 and 14.

As can be seen from FIG. 1, the barbecue grill according to the present invention is characterized by a streamlined appearance with very few visible attachment components. More specifically, when in the fully assembled form of FIG. 1, only a single bolt 21 is visible on the unit.

Figure 2:
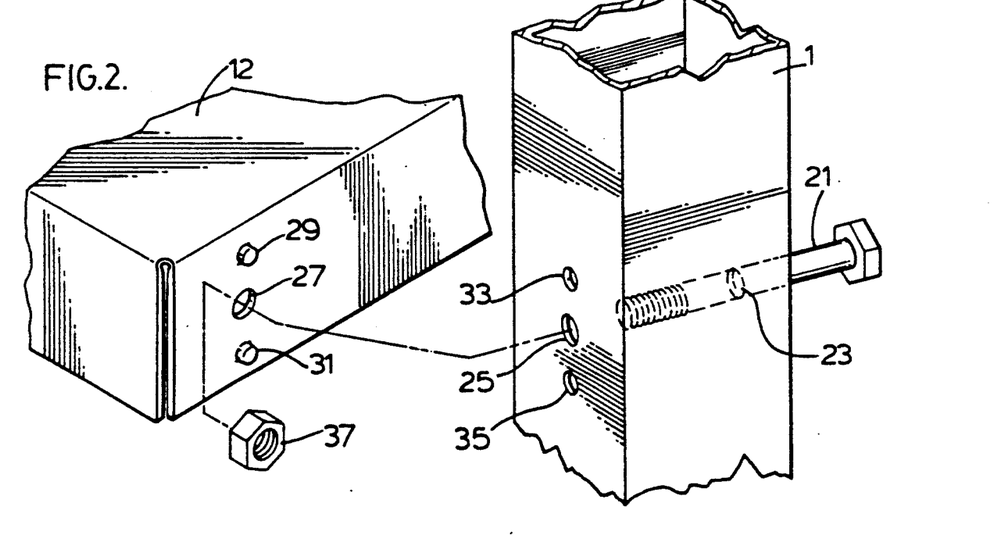
FIG. 2 shows a detailed view of the connection of a bottom shelf of the barbecue grill with a vertical leg member.

Turning to FIG. 2, the method of securing the bottom shelf 12 to the front left vertical leg member 1 is shown in detail. A similar arrangement is provided for connecting the front right corner of the shelf 12 to the front right vertical leg member 1, this view being blocked by the wheel 9 in FIG. 1.

The method of attachment comprises inserting bolt 21 through apertures 23 and 25 in vertical leg member 1 and through aperture 27 in a front edge of the shelf 12. A pair of protrusions 29, 31 project from shelf 12 and are adapted to be received in cooperatively shaped apertures 33, 35 of vertical leg member 1.

After the bolt 21 has been inserted through apertures 23, 25 and 27, the shelf 12 is manipulated so that protrusion 29 is received within aperture 33 and protrusion 31 is received within aperture 35, thereby preventing the shelf 12 from swaying or pivoting relative to in vertical leg member 1. Although the preferred embodiment uses a pair of protrusions 29, 31 and cooperatively shaped apertures 33 and 35, it is contemplated that only a single protrusion and cooperatively shaped aperture may be provided.

Finally, the bolt 21 is secured via threaded nut 37.

The shelf 12 is connected to the rear vertical leg members 1 in an identical manner.

Figures 3, 4, 5:
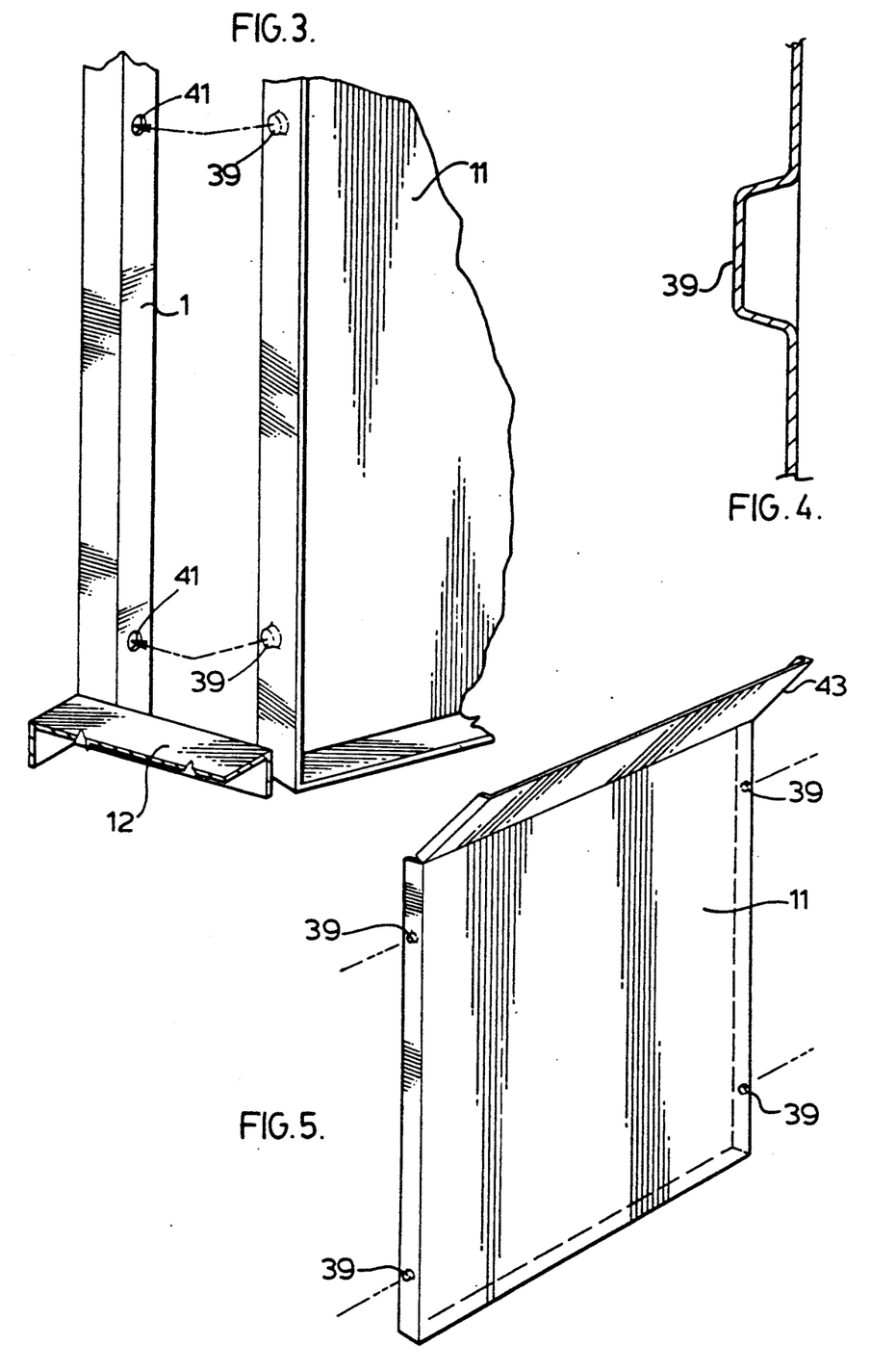
FIG. 3 is a close-up perspective view showing interconnection of a front panel of the barbecue grill with a vertical leg member thereof.
FIG. 4 is a detailed cross-sectional view of an attachment means on a side edge of the panel in FIG. 3.
FIG. 5 is a detailed perspective view of the front panel of FIG. 3.

FIGS. 3–5 show the front panel 11 in detail, and the method of attachment thereof. In particular, the front panel 11 is provided with a plurality of protrusions 39, one pair of protrusions being provided on each of the left and right sides of the panel. The protrusions 39 are adapted for insertion into cooperatively shaped apertures 41 in the left and right front vertical leg members 1, as shown in detail with reference to FIG. 3. Furthermore, one or more tabs 40 may be provided on the bottom of the panel 11 for insertion into further slots or apertures 42 in the front of bottom shelf 12.

Both the front panel 11 and bottom shelf 12 are preferably fabricated from sheet metal. Accordingly, the protrusions 29, 31 and 39 may be formed as stamped embossments in the sheet metal, as shown in detail with reference to FIG. 4. These embodiments need not be entirely covered, as shown in the Figures. Instead, the outermost portion of each protrusion 29, 31 and 39 may be open (e.g. circular hole).

Therefore, the barbecue grill of the present invention requires fewer separate attachment members such as bolts and screws than with prior art designs, such bolts and screws being easy to lose and often difficult to assemble.

As shown in FIG. 5, the front panel 11 includes a sloped portion 33 at the top thereof, which is adapted to form a streamlined interface between the panel 11 and front control panel 13.

With reference to FIGS. 6–9, the bracket 7 is shown in greater detail comprising a vertical planar member 47 extending between front and rear ones of the vertical leg members 1, a horizontal ledge 49 extending from a top edge of the vertical planar member for supporting the cooking vessel 3, and a pair of vertical corner members 51 and 53 extending from respective opposite ends of the vertical planar member 47 for connection to respective ones of the leg members 1. The vertical corner members 51 and 53 form a generally rectangular sleeve which fits over the vertical leg members 1.

The lower portion 15 of cooking vessel 3 is supported on the horizontal ledge 49 and connected via bolts 55 projecting downwardly from the base of lower portion 15 at the four corners of the cooking vessel, for insertion through cooperatively shaped apertures 57 and 59 of the horizontal ledge 49. The bolts 55 are secured in place via nuts 61 (only one bolt 55 and nut 61 being shown in FIG. 6).

Figure 6:
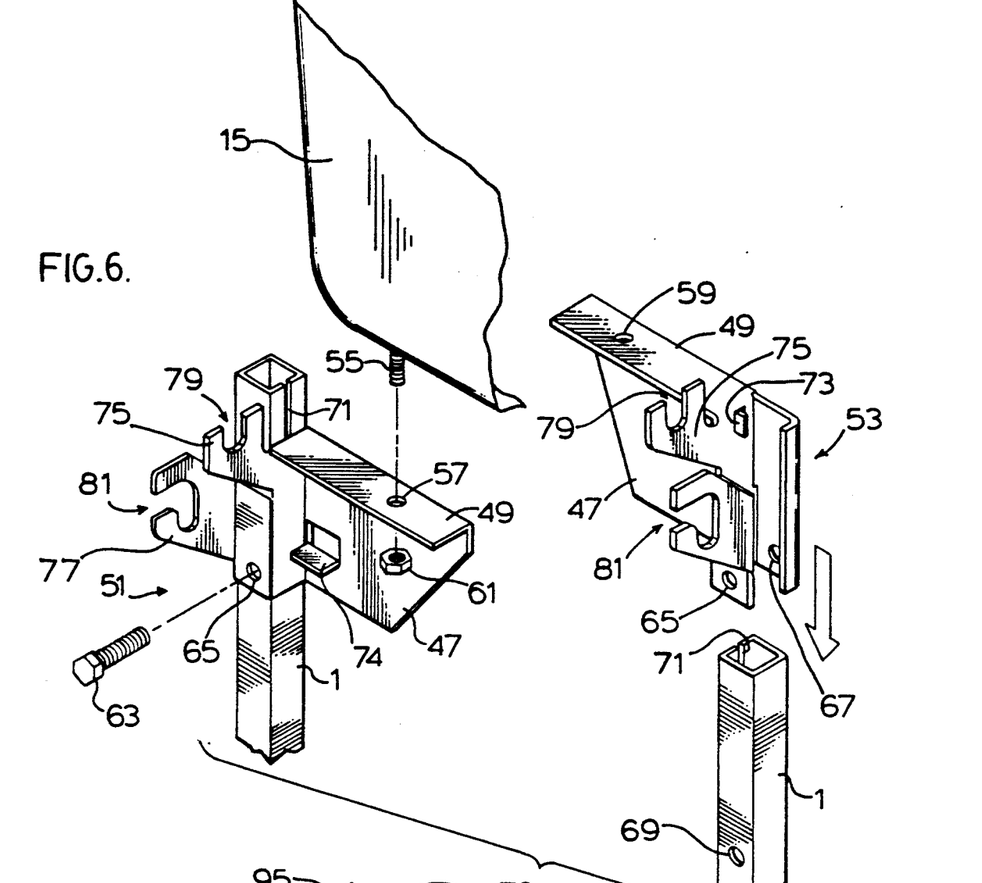
FIG. 6 is a partially broken perspective view showing interconnection of a bracket, cooking vessel and vertical leg members according to the preferred embodiment.

The bracket 7 is secured to the front and rear legs 1 via bolts 63 and cooperative nuts (not shown), which are inserted through apertures 65, 67 in the corner members 51 and 53, and the aligned holes 69 in the vertical leg members 1. Proper alignment of the holes 65, 67 and 69 is effected by means of a slot 71 in each of the vertical leg members 1 into which a tab member 73 is adapted to slide downwardly until it reaches the end of the slot 71, at which point the holes 65, 67 and 69 are aligned for insertion of bolt 63.

A further pair of tabs 74 are provided in planar member 47 to prevent twisting of the vertical corner members 51 and 53.

Therefore, the bracket 7 serves to secure the vertical leg members 1 and also to support the cooking vessel 3.

Each of the vertical corner member 51 and 53 also includes a pair of horizontally and vertically offset extensions 75 and 77 having respective slots 79 and 81 disposed therein. As shown in FIGS. 6–9, the slot 79 is generally vertical whereas the slot 81 is in the shape of a right angle.

Figure 10:
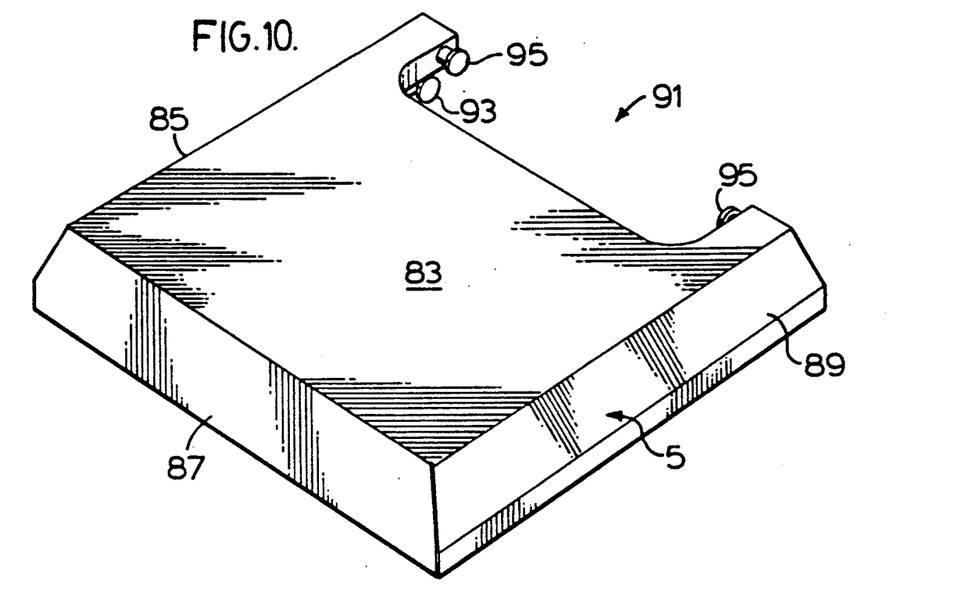
FIG. 10 is a perspective view of a drop-down side shelf according to the preferred embodiment.
Figures 11, 12:
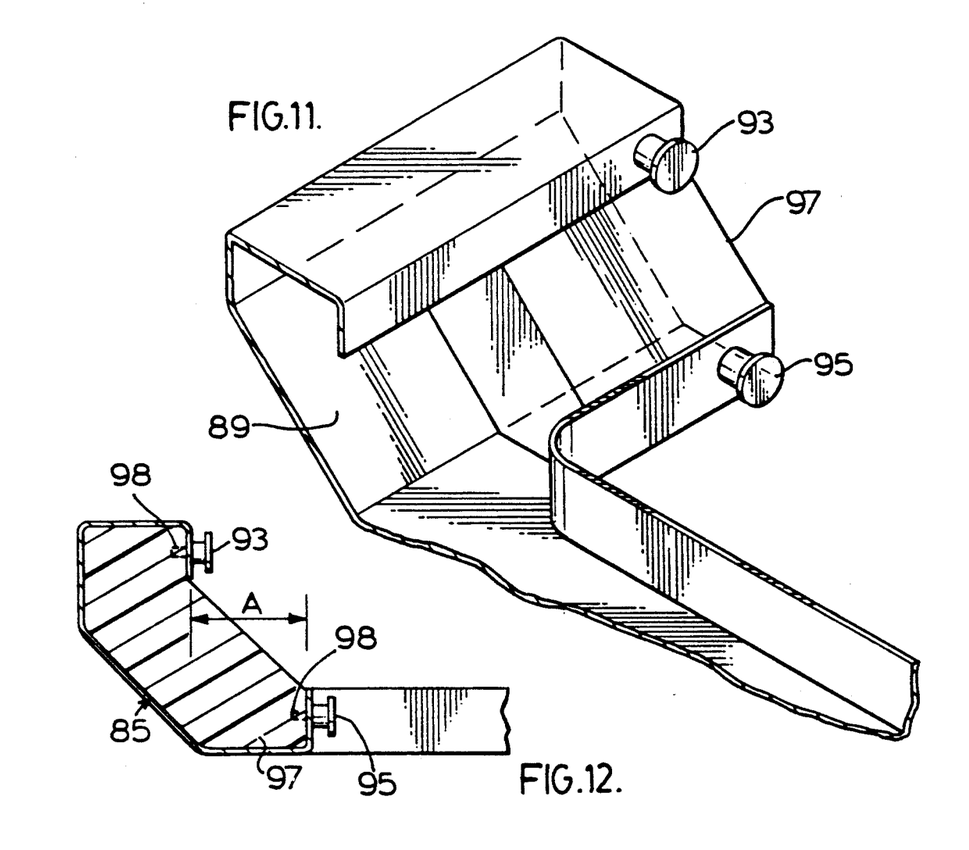
FIG. 11 is a close-up perspective view of a pair of pin attachments on the shelf of FIG. 10.
FIG. 12 is a partially broken cross-sectional view through the shelf of FIG. 10 showing the pin attachments.

Turning briefly to FIGS. 10–12, the construction of side shelf 5 is shown in greater detail. Side shelf 6 is of identical design. The side shelves 5 and 6 are preferably formed from stamped steel sheet to form a top supporting surface 83, three tapered closed sides 85, 87 and 89, and one open side 91. The open side 91 is required in order to remove successive ones of the stamped steel shelves off of a progressive dye tool during the manufacturing process. The stamped steel design of the shelf according to the present invention differs from prior art cast steel designs which are expensive, and from prior art wood slat systems which lack the aesthetic streamlined appearance of the design according to the present invention. A plug 97 is inserted into the open end 91 for boxing in, or closing the open end and increasing the strength of the shelf. The plug 97 may be fabricated from plastic, steel or other suitable material and is screwed in place via the pins 93 and 95. The block is secured in the open end 91 via threaded tips 98 and the pins 93 and 95 which extend through the shelf.

Figure 7:
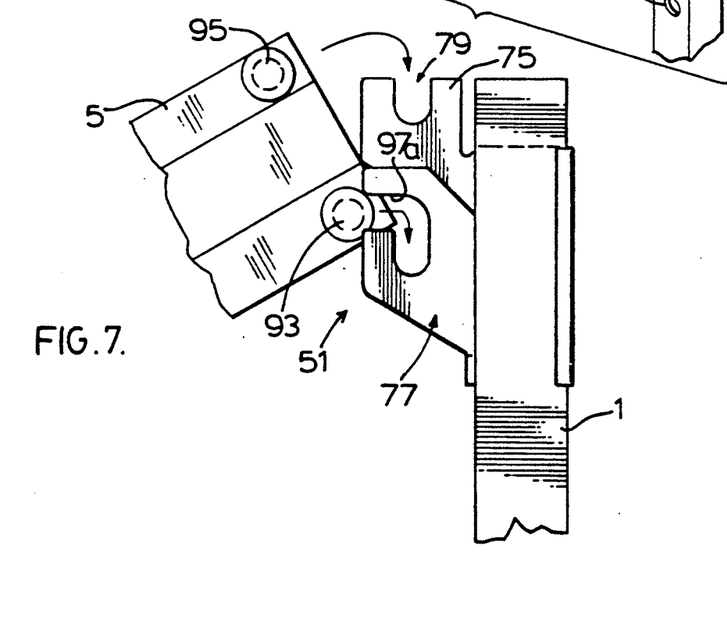
FIG. 7 is a partially broken side view showing interconnection of a drop-down side shelf with the bracket of FIG. 6.
Figure 8:
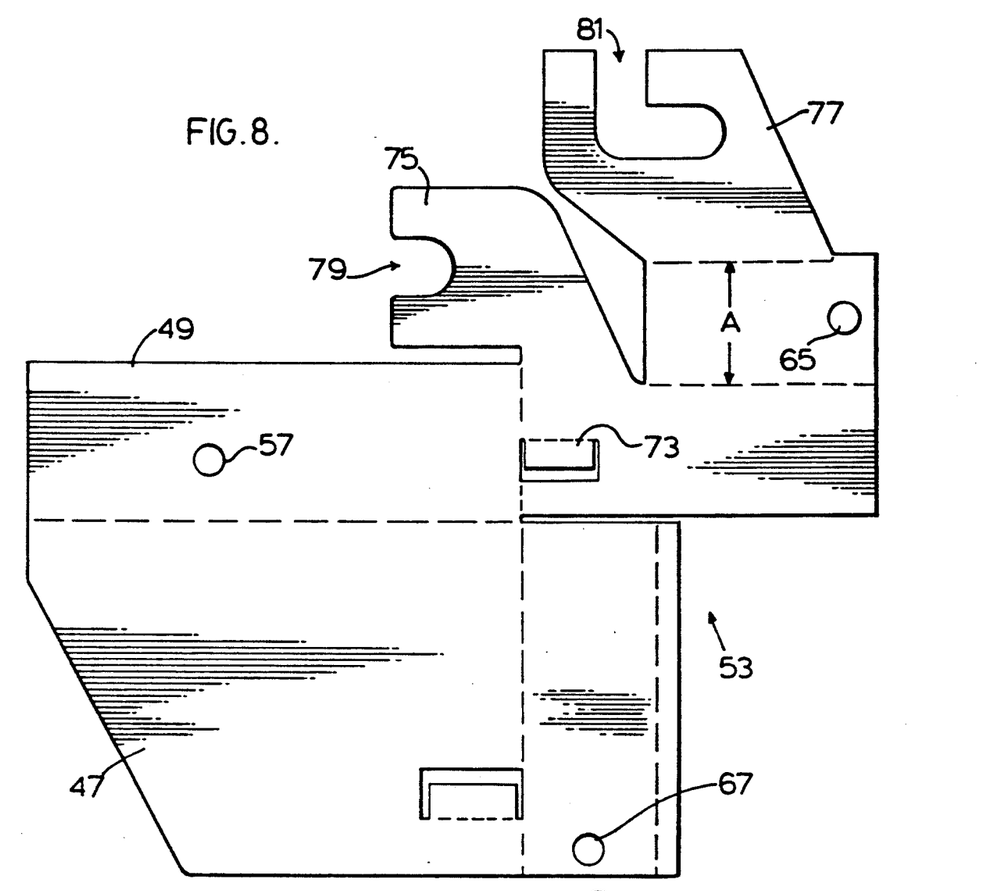
FIG. 8 is a side view of one end of the bracket in a flattened state prior to bending along the dashed fold lines to form the final configuration of bracket in FIG. 6.
Figure 9:
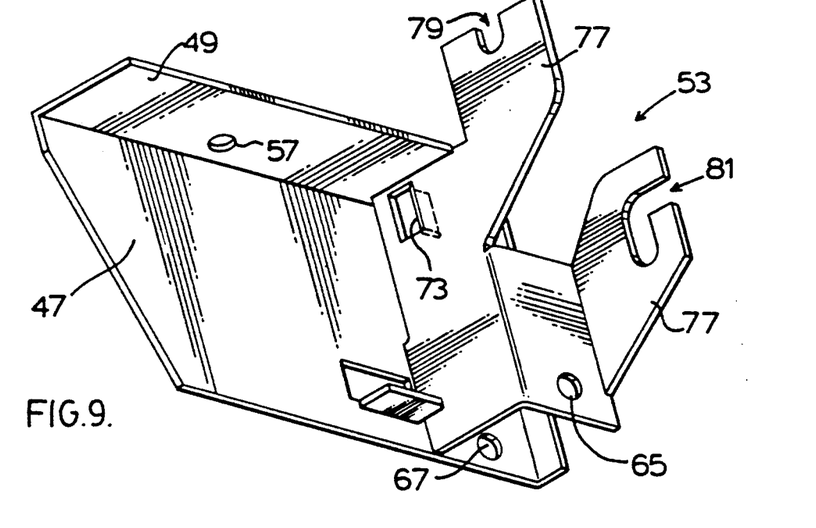
FIG. 9 is a partially broken perspective view of the bracket cord in FIG. 8.

The shelf 5 is provided with a pair of horizontally and vertically offset pins 93, 95 which are adapted to slide within respective ones of the slots 81 and 79 of the bracket 7, as shown with reference to FIG. 7. The offset distance A between pins 93 and 95 (see FIG. 13) is the same as the offset distance between horizontally and vertically offset extensions 75 and 77 (see FIG. 8).

Returning to FIG. 7, the attachment of shelf 5 to the bracket 7 is shown in detail. Specifically, the open end 91 of shelf 5 is positioned adjacent the bracket 7 so that the pins 93 on opposite sides of open end 91 are aligned with slots 81 in corner members 51 and 53 (only corner member 51 being shown in FIG. 7 for the sake of clarity). The pin 93 initially slides along the horizontal portion of right-angle shaped slot 81 until it reaches the corner of the slot. At this stage, the pin 95 may be positioned above vertical slot 79. Pins 93 and 95 are then dropped vertically downward within slots 81 and 79, respectively, so that the shelf 5 is locked in a horizontal position.

The shelf 5 may be pivoted downwardly from the horizontal position to a vertical position by lifting upwardly on the shelf so that pin 95 is removed from slot 79 and pin 93 abuts the upper horizontal ledge 97a of slot 81 (FIG. 7). The shelf 5 may then be pivoted around pin 93 so that pin 95 moves forwardly away from extension 75. The pin 93 may then be lowered again in slot 81 for further pivotal movement of the shelf 5 downwardly to a vertical position. In this position, the shelf 5 hangs vertically downwardly supported only by pins 93 on either side.

The shelf 5 may be removed entirely from the bracket 7 by removing the pins 93 and 95 from their respective slots 81 and 79 by first lifting them upwardly and then pulling the shelf horizontally away from bracket 7.

Figure 13:
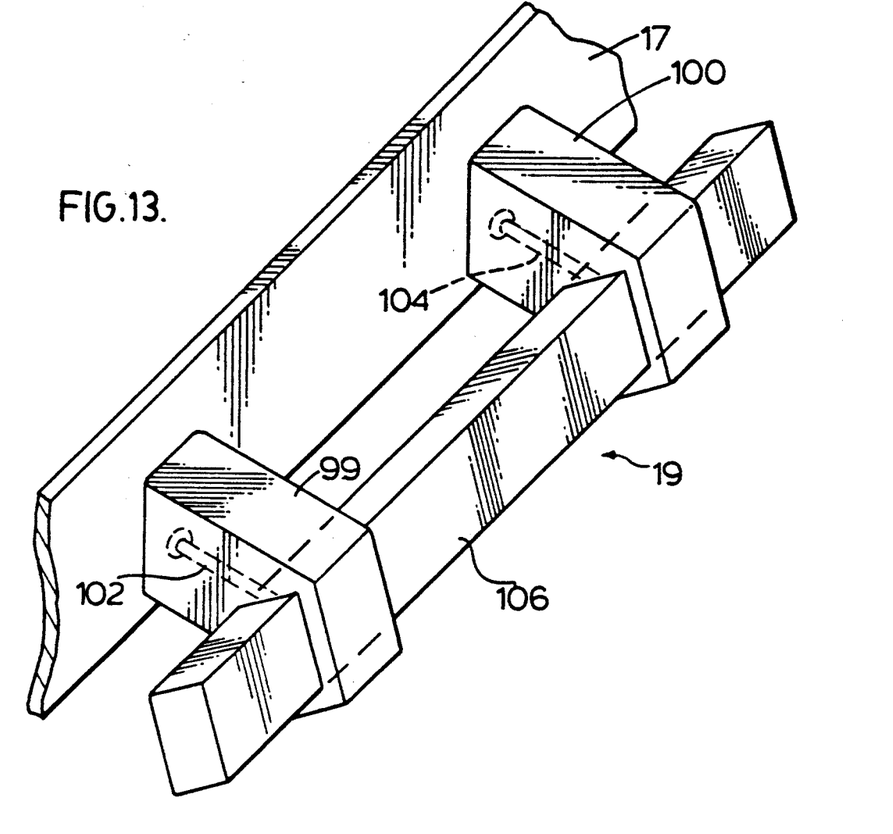
FIG. 13 is a perspective view of a lid handle according to the preferred embodiment.
Figure 14:
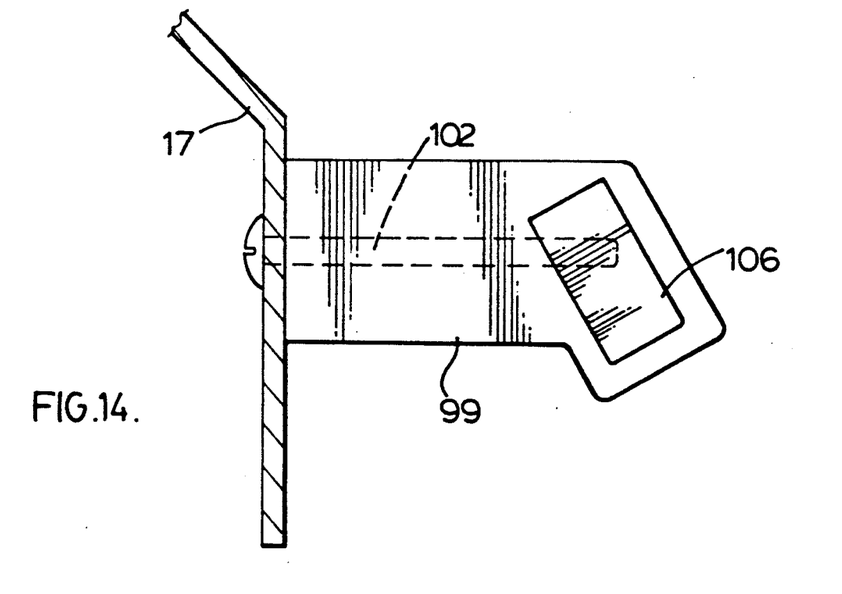
FIG. 14 is a side view of the handle in FIG. 13.

With reference to FIGS. 13 and 14, the handle 19 is shown in greater detail comprising a pair of extension members 99 and 100 connected to the lid 17 via bolts 102 and 104 which extend centrally therethrough from inside of the lid 17, so as to shielded from view. The bolts 102 and 104 also extend into a cross piece member 106 which is disposed at an angle to the lid 17 so as to be parallel with the angle of taper of the side 89 of shelf 5.

Figure 15:
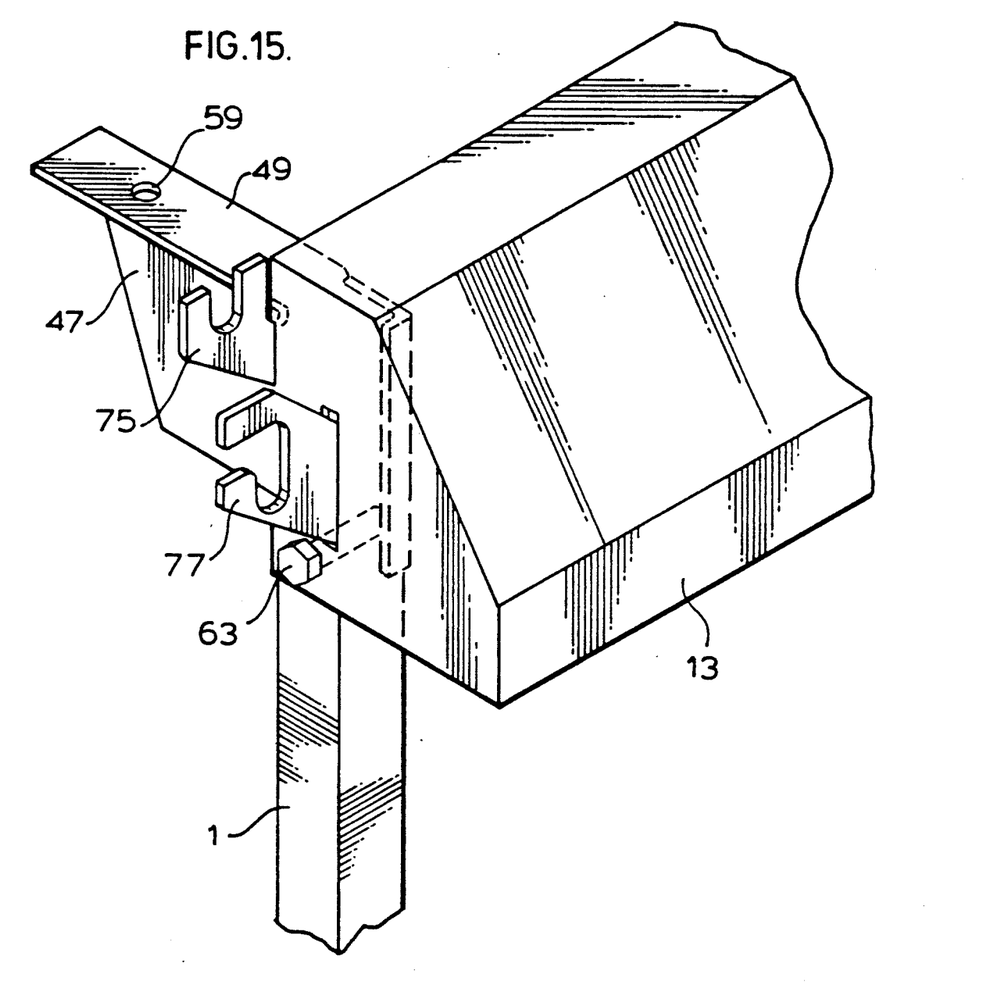
FIG. 15 is a perspective view showing attachment of a control panel to the bracket of FIG. 6.

Finally, turning to FIG. 15, the control panel 13 is shown connected to the bracket 7 and leg members 1 by means of the bolt 63 (see FIG. 6). The panel 13 includes notches 110 and 112 for accommodating extensions 75 and 77, respectively, and to assist in positioning the panel 13 relative to bracket 7 and leg 1 for receiving the attachment bolt 13. FIG. 15 shows the left-side connection of panel 13. Of course, a similar structure is provided on the right side of panel 13.

In summary, the barbecue grill of the present invention forms an aesthetically pleasing streamlined shape in assembled form, and requires very few attachment components such as screws and bolts, many of such components being replaced by snap-fit protrusions and apertures. Furthermore, many of the few attachment components which are required are shielded from view by structural features of the design.

Alternative embodiments and modifications of the invention are possible without departing from the sphere and scope of the claims appended hereto.

We claim:

1. A barbecue grill comprising:
   a) a plurality of vertical leg members;
   b) a cooking vessel;
   c) bracket means for securing said vertical leg members and supporting said cooking vessel, said bracket means having a pair of oppositely disposed shelf attachments, each of said shelf attachments having a pair of horizontally and vertically offset extensions with slots therein; and
   d) at least one side shelf having a pair of horizontally and vertically offset pin means on opposite sides thereof adapted to slide within respective ones of said slots for selectively:
      i) locking said shelf in a horizontal position;
      ii) pivoting said shelf downwardly from said horizontal position to a vertical position;
      iii) removing said shelf from said bracket means.

2. The barbecue grill of claim 1 wherein said bracket means further comprises:
   e) a vertical planar member extending between front and rear ones of said vertical leg members;
   f) a horizontal ledge extending from a top edge of said vertical planar member for supporting said cooking vessel; and
   g) a pair of vertical corner members extending from respective opposite ends of said vertical planar member for connection to respective ones of said leg members.

3. The barbecue grill of claim 2 wherein said horizontally and vertically offset extensions project outwardly from said pair of vertical corner members.

4. The barbecue grill of claim 3, wherein each of said horizontally and vertically offset extensions further comprises a first finger member having a generally vertical slot, and a second finger member having a generally right-angle shaped slot disposed below and laterally offset from said first finger member.

5. The barbecue grill of claim 1, wherein said side shelf is fabricated from stamped sheet metal with one open side adjacent said pin means, a top supporting surface, and three closed sides.

6. The barbecue grill of claim 5, wherein said open side is boxed in via a plug secured to said shelf via said pin means.

7. The barbecue grill of claim 5, wherein at least one of said three closed sides is sloped outwardly from said top surface.

* * * * *